United States Patent Office.

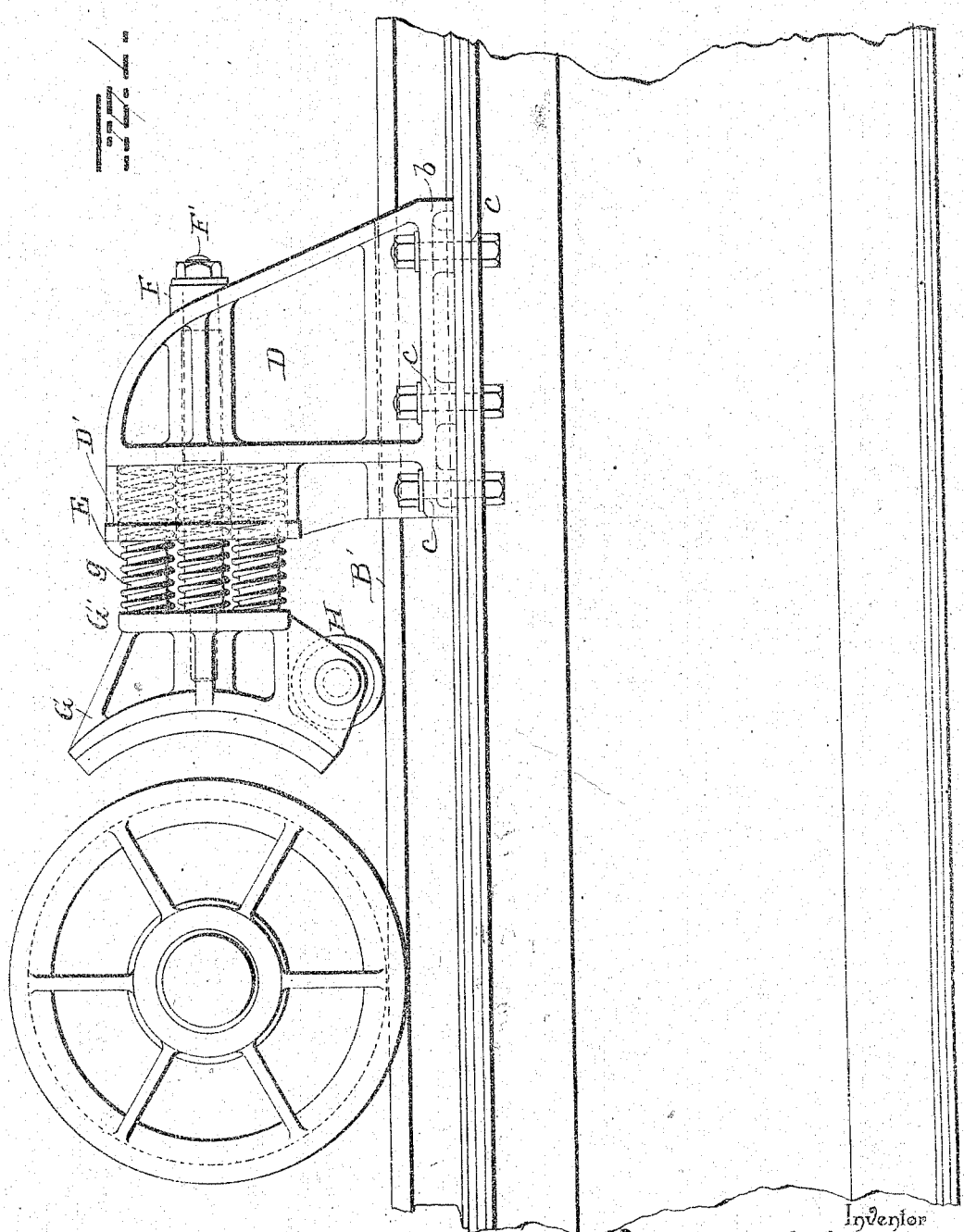

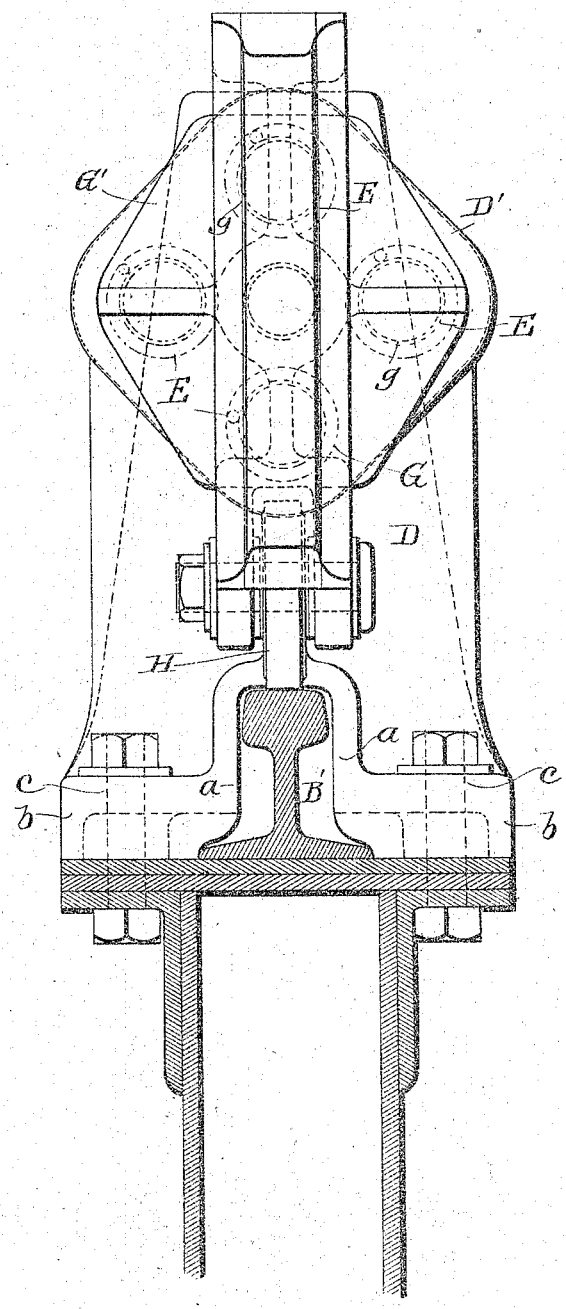

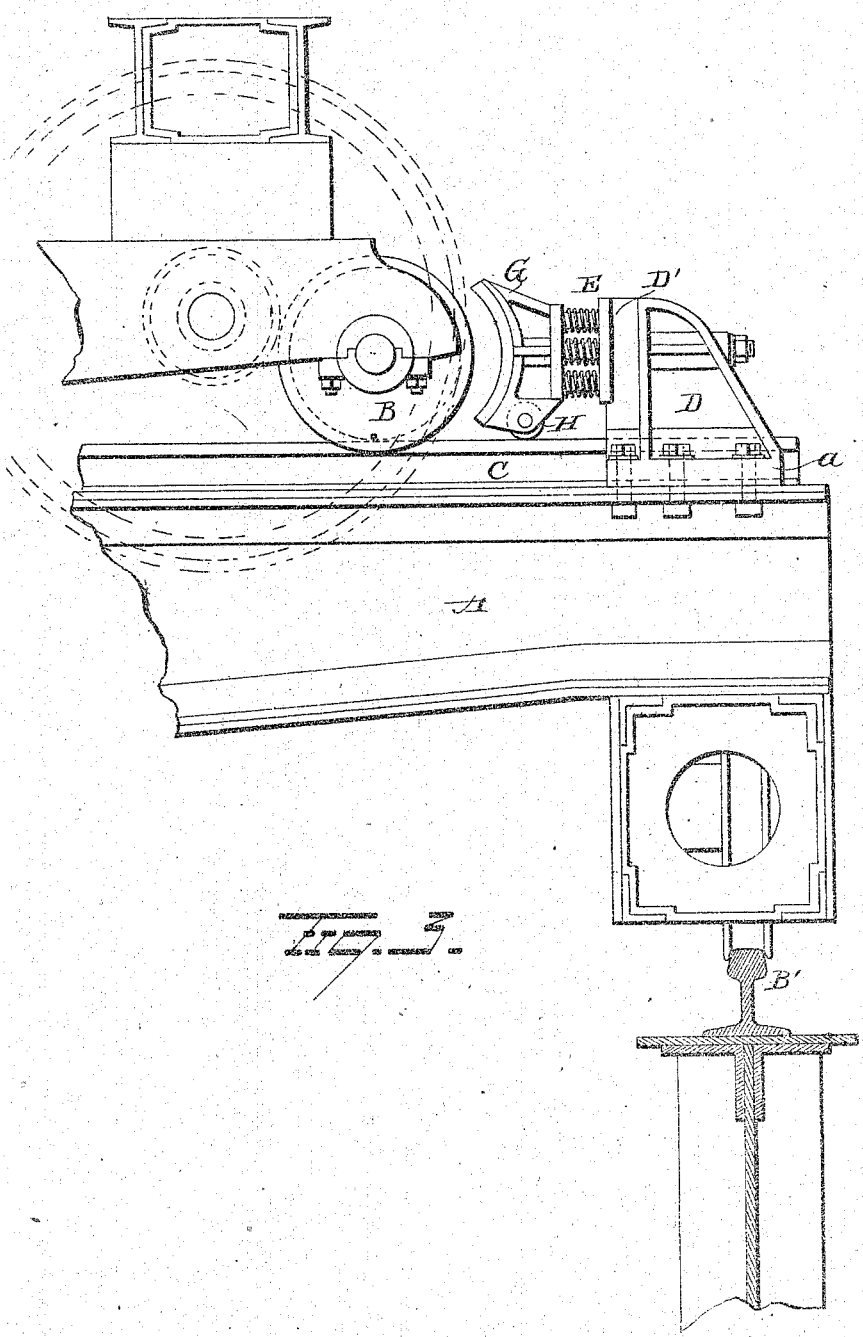

WILLIAM HENRY MORGAN, OF ALLIANCE, OHIO.

OVERHEAD TRAVELING CRANE.

SPECIFICATION forming part of Letters Patent No. 560,738, dated May 26, 1896.

Application filed September 7, 1895. Serial No. 561,863. (No model.)

*To all whom it may concern:*

Be it known that I, WILLIAM HENRY MORGAN, of Alliance, in the county of Stark and State of Ohio, have invented certain new and useful Improvements in Overhead Traveling Cranes; and I do hereby declare the following to be a full, clear, and exact description of the invention, such as will enable others skilled in the art to which it appertains to make and use the same.

My invention relates to an improvement in overhead traveling cranes, and more particularly to that class of cranes wherein a traveling trolley or trolleys are mounted on a traveling bridge. Up to the time of the employment of the electric motor on this class of cranes the speed of the bridge and the trolley thereon was, owing to the complicated character of the driving-gear, necessarily slow, and it was not a difficult matter to promptly stop them at the end of their respective trackways. Since the introduction of the electric motor on cranes of this class a much wider range of speed of bridge and trolley is attainable, and the danger of the bridge leaving the track at the ends of the track or the trolley leaving the bridge is correspondingly increased.

The object of my invention is to provide means for preventing the trolley from leaving the bridge at the ends thereof or the bridge leaving its trackway at the terminals; and it consists in the parts and combinations of parts, as will be more fully described, and pointed out in the claims.

In the accompanying drawings, Figure 1 is a view of a section of an overhead traveling crane embodying my invention. Fig. 2 is a view in end elevation of one form of yielding buffer. Fig. 3 is a view showing the buffer on the bridge.

A represents a traveling bridge actuated by any suitable motive power.

B is a trolley-wheel mounted on the bridge and adapted to move lengthwise thereof, the said trolley being preferably propelled by electric motors, and B' is the trackway on which the bridge travels. In some instances the ends of trackway C and trackway B', on which trolley B and bridge A respectively move, are turned up, forming abutments to limit end travel of trolley and bridge. In other cases stops of various kinds are attached to the tracks, and in others no provision is made for limiting end travel. Owing to the fact that the operator who controls the movements of the bridge and trolley is located in a cage below the bridge it frequently happens that the trolley and bridge collide with considerable force against the respective end abutments and are frequently injured, and if they should overrun or ride over the abutments considerable damage if not loss of life would result and considerable expense incurred in replacing the bridge or trolley on the track.

To prevent the trolley from leaving the track at the ends or from passing predetermined points on said track and to prevent the bridge from leaving track B', I employ the frames or brackets D. Each frame is bifurcated at its lower end, as shown at $a$, Fig. 2, to straddle the rail, and is provided at its base $b$ with holes $c$ for the passage of bolts which secure it to the girder carrying the rail. This bracket is provided with the buffer G. (Shown in Figs. 1 and 3.) While a single buffer over a rail on the trackway on the bridge and on the longitudinal runway on which the bridge moves might be sufficient, I prefer to use a buffer over each rail. Each bracket is provided with an enlarged head D', preferably integral therewith, and each head is provided with a recess to receive the inner ends of a series of springs E or with a recess for each spring and is provided centrally with a bore or sleeve F for the passage of the bolt F', carried by the buffer G.

The buffer G consists, essentially, of a shoe shaped like a brake-shoe and provided at its rear side with a base-plate G'. This base-plate carries a series of studs $g$, which latter form seats or supports for the outer ends of the springs E. These springs, being between the bracket D and base-plate G' of the shoe, operate to hold the shoe away from the bracket. The shoe rests with its horizontal center approximately in line with the horizontal plane of the wheel with which it engages, and as the shoe is shaped to conform to the periphery of the wheel it overlaps the wheel above its center and, besides operating as a brake, absolutely prevents the wheel from rising and consequently prevents the trolley from riding over the ends of the bridge or the bridge from riding over the ends of the longitudinal runway. When the wheels first come in contact with the shoe, the shoe operates to brake the wheels. The momentum, however, would cause the part to slide, and to allow for this movement and for the further purpose of bringing the part to a standstill without undue shock I interpose the springs. Thus it will be seen that as the wheel first strikes the shoe the latter operates as an ordinary brake, but yields in the direction of movement of the part carried by the wheel, the friction against the wheel increasing as the springs are compressed. This yielding action of the brake not only absorbs the shock, but it overcomes the tendency a wheel has to ride over a stationary object. As the wheel tends to creep up on it the shoe advances, thus gradually and effectually bringing the part to a full stop. To hold the shoe solidly against displacement and to relieve the bolt F of considerable strain, I provide each shoe G with a small track-wheel H, which latter runs on the rails and prevents dangerous downward strains on the parts carrying the shoe. These buffers are applied to the rails on the bridge for engaging the wheels carrying the trolley and also on the rails of the longitudinal runway on which the wheels carrying the bridge travel, and while I prefer to construct and locate the shoe to engage the wheels of the several parts it will be seen that the shoe might engage the trolley-frame and bridge-frame, either or both, and thus operate to stop the movement and also prevent the part from riding up; but I prefer to have the shoes engage the wheels, as they then, in addition to performing the function of buffers, also operate as brakes.

Having fully described my invention, what I claim as new, and desire to secure by Letters Patent, is—

1. The combination with a track v and a movable part mounted on wheels adapted to travel thereon, of a frame rigid with the trackway and projecting above same and a buffer yieldingly supported at the upper end of said frame, the said buffer having a concave or curved bearing-face adapted to engage the tread of a wheel of the movable part, substantially as set forth.

2. A buffer for engaging the wheel of a movable part consisting of a bracket secured adjacent to a trackway, a curved shoe carried by the bracket and a spring interposed between the shoe and bracket.

3. A buffer for engaging the wheel of a movable part consisting of a bracket secured adjacent to a trackway, a curved shoe carried by the bracket, springs interposed between the shoe and bracket and a roller or wheel carried by the shoe and moving in contact with the rail, substantially as set forth.

In testimony whereof I have signed this specification in the presence of two subscribing witnesses.

WILLIAM HENRY MORGAN.

Witnesses:
E. WOOLGAR,
T. D. RUSSELL.